United States Patent [19]
Conklin

[11] 3,769,894
[45] Nov. 6, 1973

[54] GOLF GAME

[75] Inventor: Robert M. Conklin, Muskegon, Mich.

[73] Assignee: Brunswick Corporation, Skokie, Ill.

[22] Filed: Aug. 24, 1970

[21] Appl. No.: 66,655

Related U.S. Application Data

[62] Division of Ser. No. 685,176, Nov. 22, 1967, Pat. No. 3,712,624.

[52] U.S. Cl. .................................. 95/85, 273/184
[51] Int. Cl. ...................................... G03b 15/00
[58] Field of Search ............... 95/85; 273/184, 185

[56] References Cited
UNITED STATES PATENTS
3,552,290   1/1971   Brechtel ............................ 95/85
3,633,007   1/1972   Sanders ............................. 273/184

*Primary Examiner*—John M. Horan
*Attorney*—Hofgren et al.

[57] ABSTRACT

A golf game for accurately and realistically displaying the results of golf shots to a golfer including a tee area whereat a golfer may hit a golf ball, a screen in front of the tee area, means for projecting on the screen any one of a plurality of scenes taken from different locations on a golf hole, data acquisition means associated with the tee for providing information relative to the trajectory of a ball hit from the tee by a golfer, a computer responsive to the data acquisition means for computing the trajectory of the ball, and ball spot projecting means responsive to the computer for projecting a spot of light on the screen and on the scenes displayed thereon to illustrate the trajectory of the ball to the golfer, the scenes being displayed to the golfer being of a golf course illustrating a flat playing surface so that the final location of the golf ball on the hole will be accurately and realistically indicated on the screen by the ball spot projecting means; and a method for providing the scenes.

5 Claims, 9 Drawing Figures

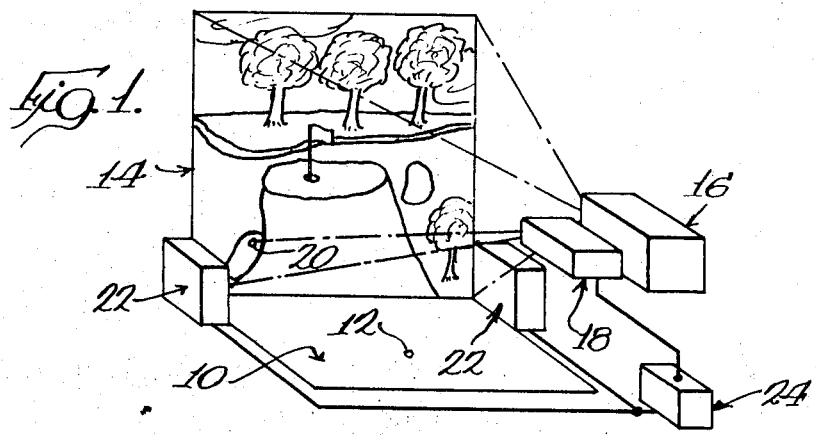
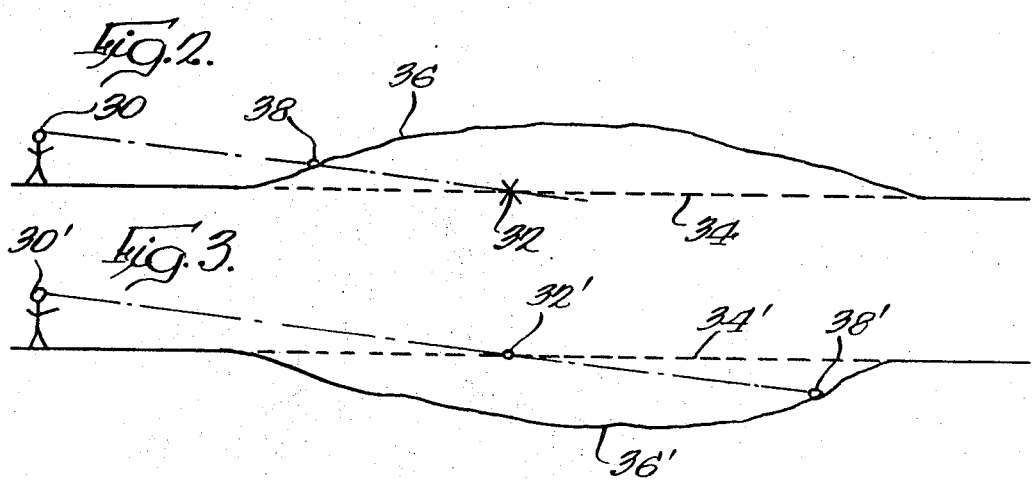
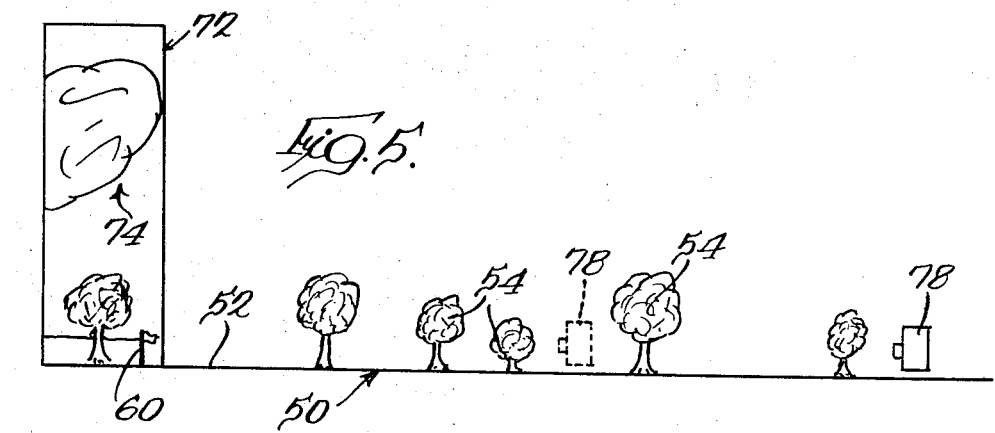

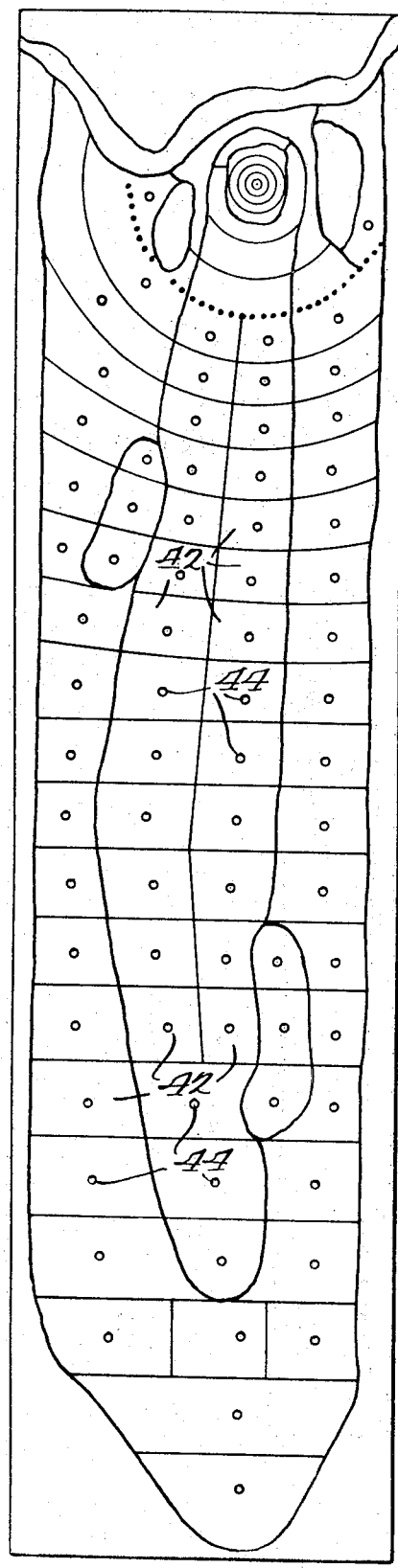

GOLF GAME

CROSS REFERENCE

This is a division of application Ser. No. 685,176 filed Nov. 22, 1967, now U.S. Pat. No. 3,712,624.

BACKGROUND OF THE INVENTION

The ever-continuing upsurge in the popularity of golf has led to the overcrowding of existing golf course facilities. Because golf courses occupy a great deal of land and are expensive to maintain, the guilding of new courses has not taken place at a sufficiently rapid rate to accommodate the ever-increasing number of players. As a result, whereas in past years, 4 hours was the usual measure of time required to play 18 holes, many golfers today consider themselves fortunate if they are able to complete 18 holes in 5 hours.

Another problem for the avid golfer of today is the fact that in many parts of the United States, due to weather conditions, golf is a seasonal sport. For example, in some of the northernmost regions of the continental United States, golf may only be played outdoors for about 4 months out of each year.

In order to eliminate overcrowding and to reduce the seasonal nature of the game of golf, it has been suggested that indoor golf games be provided to increase the number of golfing facilities available to golfers (which require very little space) thereby eliminating the overcrowding problem and simultaneously reducing the seasonal nature of this game because such establishments are indoors, making it possible to play the year around.

A few such indoor establishments have been operated on a commercial scale. Typically, such indoor golf games provide a tee area from which the golfer may hit a golf ball towards a screen which has projected thereon a scene representing a portion of a hole on a golf course. As the golfer advances the ball towards the cup, the scene is changed to reflect the position of the golfer with respect to the hole and provide him with the view of the hole as it would be seen from the point where the shot would have come to rest so that he may play his next shot having an appropriate scene before him.

Computation means are used in conjunction with means for acquiring data relative to the trajectory of the ball hit from the tee area to compute the nature of the trajectory of the ball and thereby the distance the shot would have traveled in order that the next scene may be selected. Additionally, the computed distance that the shot would have traveled is displayed to the golfer.

Such systems have a significant drawback in that the nature of the flight of the ball is not displayed to the golfer except in terms of the final length of the shot and as a result, such games lack realism in that on an outdoor golf course, the golfer may visually follow the entire flight of the ball.

It has also been proposed to eliminate the above-noted lack of realism by providing a ball spot projector which moves a spot of light on the projected scene in a manner to simulate the flight of the ball. However, prior to the instant invention, no such systems are known to have been commercialized.

While the use of a so-called ball spot projector does enhance the realism of an indoor golf game, if used indiscriminately, it may indicate the flight of a ball so inaccurately as to irritate the golfer playing the game so that the degree of extra realism provided by its presence is not sufficient to economically justify the additional equipment involved.

SUMMARY OF THE INVENTION

It is the principal object of the invention to provide a new and improved golf game.

More specifically, it is an object of the invention to provide a new and improved golf game utilizing a ball spot projector in conjunction with other equipment that very accurately depicts the computed trajectory of a golf ball for use in indoor golf games.

Even more specifically, it is an object of the invention to provide a new and improved method of providing perspective scenes of portions of the hole on a golf course for use in indoor golf games, which, together with a ball spot projector and related equipment, accurately depicts to a golfer playing the game the trajectory of a ball and the final point of rest thereof.

An additional object of the provision of a method for providing perspective scenes of portions of a hole on a golf course for use with golf games wherein scenes illustrating portions of a golf hole are displayed to a golfer, the golfer hits a ball, parameters relative to the trajectory of a ball are measured and the trajectory of the ball is computed on the basis of the parameters and the results of the computation are displayed to the golfer by projecting a spot of light on the displayed scene, the method maximizing the accuracy of the ball flight displayed to the golfer and including the steps of building a model of a golf hole on a reduced scale, the model having a flat playing surface, and photographing the playing surface from differing points on the model.

A further object is the provision of a method such as that set forth in the preceding paragraph wherein the step of building the model further includes building the model on a member having an upper, planar surface and providing a generally vertical backdrop therefor, the backdrop including indicia indicating a horizon line, and the step of photographing further includes utilizing a camera to photograph the playing surface and orienting the camera so that the horizon line on the backdrop will be in the same position with respect to the vertical in each scene taken on the model.

A further object is the provision of a golf game including a tee area, a screen in front of the tee area, a plurality of scenes illustrating differing portions of a golf course having a generally flat playing surface, means for projecting any one of the scenes on the screen, data acquisition means for providing information relative to the trajectory of a ball hit from the tee, means responsive to the data acquisition means for computing the trajectory of a ball, and means responsive to the computing means for projecting a spot of light on the screen and on the scenes displayed thereon to illustrate the trajectory of the ball to a golfer, the flat course depicted in the scenes enabling the final location of the ball on the hole to be accurately and realistically indicated on the screen by the ball spot projecting means.

A still further object is the provision of a golf game such as that set forth in the preceding paragraph wherein each scene represents a differing portion of a model golf course built on a reduced scale and having a generally flat playing surface.

Another object is the provision of a golf game including a tee area, a screen in front of the tee area, a plurality of scenes illustrating differing portions of the golf course, each scene including a reference point with the reference point on each scene being at the same location on the scene with respect to the vertical as the reference point on each other scene, means for projecting any one of the plurality of scenes on the screen, data acquisition means for providing information relative to the trajectory of a ball hit from the tee, means responsive to the data acquisition means for computing the trajectory of a ball and means responsive to the computing means for projecting a spot of light on the screen and the scenes displayed thereon to illustrate the trajectory of the ball to a golfer.

Yet another object is the provision of a golf game such as that set forth in the preceding paragraph wherein each of the scenes further illustrates the hole on a golf course and the reference point comprises a horizontal line demarking the horizon and is spaced above the hole and to the rear thereof as viewed in perspective, each of the scenes further depicting a golf course having a flat playing surface.

Other objects and advantages of the invention will become apparent from the following specification taken in conjunction with the accompanying drawings.

DESCRIPTION OF THE DRAWINGS

FIG. 1 is a schematic perspective view of an indoor golf game embodying the invention;

FIG. 2 is a schematic side elevation of a form of inaccuracy in an outdoor golf game that is avoided through use of the invention;

FIG. 3 is a schematic side elevation showing another form of inaccuracy that is avoided;

FIG. 4 is a plan view of a map of a golf hole that may be used in playing the golf game;

FIG. 5 is a schematic side elevation of a structure used in performing a method according to the invention;

FIG. 6 is a perspective view of the structure;

FIG. 7 is an enlarged, schematic side elevation, with parts broken away for clarity, of the structure;

DESCRIPTION OF THE PREFERRED EMBODIMENT

Figure 8:
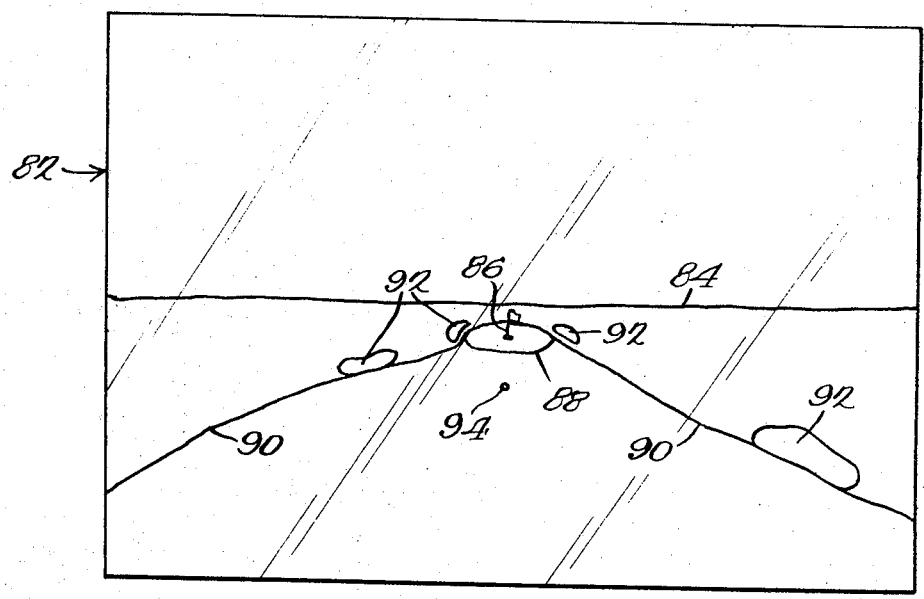
FIG. 8 is a schematic front view of a projected scene in accordance with the invention.

An exemplary embodiment of a typical indoor golf game installation with which the invention is intended to be used is illustrated in FIG. 1 and is seen to comprise a tee area generally designated 10 having a tee point 12 where a golf ball may be placed to be hit by a golfer. In front of the tee area 10 is a screen generally designated 14 which has projected thereon a scene by a scene projector generally designated 16. There is also provided a ball spot projector, generally designated 18 which projects a spot of light 20 on the scene on the screen 14 in a manner that simulates the flight of a golf ball.

Data acquisition equipment, generally designated 22, may be located between the tee point 12 and the screen 14 or behind the screen 14 or both, for measuring parameters of the trajectory of a ball hit from the tee point 12. The parameter information thus acquired is then fed to a computing apparatus 24 which continuously computes the trajectory of the ball hit from the tee point 12 throughout the flight thereof based on the parameters and provides output to the ball spot projector 18 so that the spot of light 20 will be moved accordingly to illustrate the flight of the ball. Of course, when the flight has terminated, the ball spot 20 will be at rest.

In order to insure accurate alignment of the projected scene on the screen 14 so that the final resting point of the spot 20 is indicative of the true point of termination of the shot, the projector 16 preferably includes a means for accurately aligning the projected scene on the screen and may be of the type disclosed in the copending application of Pratt et al., Ser. No. 574,218, filed Aug. 22, 1966, entitled "Visual Display System", and assigned to the same assignee as the instant application. Furthermore, in order to insure that the final resting place of the spot 20 is related to the distance the ball would have traveled, a means for controlling the final position of the projected spot 20 with respect to the vertical in proportion to the computed distance that the shot would have traveled should be provided. Suitable means for this purpose are disclosed in the copending application of Russell et al, Ser. No. 588,922, filed Oct. 24, 1966, entitled "Golf Game Computing System" and assigned to the same assignee as the instant application.

Of course, in order to insure a proper correlation between the projected scene, the screen and the spot projected by the ball spot projector, it is necessary that certain relationships exist. Such relationships are of the nature of physical locations of the elements with respect to each other rather than of electrical or mechanical interconnections and are disclosed in the Pratt et al. and Russell et al. applications. For the purpose of the instant application, it is sufficient to say that the accurate aligning means of the Pratt et al. application insure that each scene will occupy the same area on the screen while the ball spot projector used with the means for controlling the final position of the projected spot disclosed by Russell et al is physically arranged with respect to the screen and thus to the projected scene so that the final position of the projected spot will always be in the same location on the screen for identical shots. Thus, through the use of the above-identified means of both Russell et al and Pratt et al, identical shots will always be indicated in an identical manner on the same scene.

When the above-mentioned means as disclosed in the above-cited Pratt et al and Russell et al applications are used, the realism of the simulated ball flight portrayed by the projected spot 20 is considerably enhanced over that achieved in prior art ball spot projecting systems. However, another difficulty presents itself and the instant invention is directed to the solving of such a difficulty.

Even if the above-mentioned means of Pratt et al and Russell et al are utilized, significant inaccuracy in the final location of the projected spot may exist if the scene projected on the screen 14 is not appropriately chosen. The reason for this will become apparent from a brief discussion of the content of the above-cited Russell et al application. The Russell et al computing device computes continuously throughout the flight of the ball, three coordinates of the ball in space. The first coordinate is the so-called "X" coordinate which is the distance to the right or to the left of a straight line extending from the tee (point at which a ball is struck) to the hole on the golf course. The second coordinate is the so-called "Y" coordinate which is the distance of the ball above a horizontal plane running through the tee point. The third and final coordinate is the so-called "Z" coordinate which is the distance from the tee point along the straight line mentioned in conjunction with the description of the X coordinate.

In order to indicate the final location of the ball by movement of the projected spot 20, the Russell et al computer provides information as to the X, Y and Z coordinates when the ball has come to rest. For a plurality of differing shots made from the same tee point, it would be apparent that the coordinates at the point of termination for each shot would differ from the coordinates of the point of termination of each other shot if the terrain of the golf course was uneven. That is, a ball at rest in a valley on a golf course would have a different Y coordinate than a ball coming to rest on a hill; a ball directed to the right would have a different X coordinate than a ball directed to the left and a "dubbed" shot would have a different Z coordinate than a "super" shot.

Of the three coordinates, only the final Y coordinate is dependent upon the terrain of the golf course, the final X coordinate being principally dependent on the initial direction and velocity of the shot and side spin, if any, and the final Z coordinate being principally dependent upon the initial angle of elevation of the shot and the initial velocity of the shot.

The final Y coordinate is dependent upon the terrain of the course because the ball will always rest on the ground and the terrain of the course could vary for each combination of X and Z coordinates. Thus, in order to compute the final Y coordinate, it would be necessary to provide a vast memory system containing information as to the Y coordinate of ground level for each combination of varying X and Z coordinates. One will immediately recognize that the provision of such a memory in an operable system would be an extremely complex undertaking fraught with many problems. Furthermore, even if such a memory system could be used in conjunction with the computing system, those skilled in the art would recognize that the provision of the same would so greatly increase the cost of components of the golf game that the same could not be manufactured on a commercial basis sufficiently economically so that golfers could play the game at a reasonable price.

In order to obviate the need for such huge memory facilities, the Russell et al computation system assumes that the terrain on the course has the same Y coordinate for all combinations of X and Z coordinates. In other words, the Russell et al system assumes that the course is flat. As a result of such an assumption, the computation system is significantly simplified. Specifically, instead of providing a vast number of bits of information relative to the Y coordinate of the terrain of the golf course at each of a plurality of X and Z coordinates for each of eighteen holes, it is only necessary to provide a single bit of information which absolutely identifies the Y coordinate for each and every combination of X and Z coordinates for each of eighteen holes.

In the specific embodiment disclosed in the Russell et al application, and as mentioned above, the final position of the projected spot 20 with respect to the vertical is varied according to the computed distance that the shot would have traveled. And since the computation system considers that the course is flat at all points thereon, for all shots having the same final Z coordinate, the projected spot 20 will be at the same height on the screen 14 irrespective of the X coordinate.

If, however, the terrain of the projected scene on which the spot 20 is moved is non-uniform, the final position of the projected spot may give the golfer the illusion that he either hit the ball further than he actually did or that he did not hit the ball as far as he did. As a result, the realism of the game is decreased.

FIGS. 2 and 3 typify, in schematic form, the type of errors referred to in the preceding paragraph. Referring specifically to FIG. 2, a golfer generally designated 30 has driven a ball which the computer determined came to rest at a point 32 on a horizontal plane 34. However, if the scene presented to the golfer 30 by the projector 16 shows a hill in the foreground as indicated by a terrain line 36, the golfer 30 will see the ball on the scene as if it were at a point 38 which is significantly closer to the golfer 30 than the point 32. Thus, the indication to the golfer would be unrealistic and may cause the golfer to feel that the game is not worth while.

Referring to FIG. 3, a different type of situation causing error in display is illustrated. A golfer 30' has hit a ball which the computer has determined came to rest at a point 32' on a horizontal plane 34'. However, if the projected scene illustrates a valley in the foreground as indicated by the terrain line 36', the position of the projected spot will be indicated on the projected scene at 38'. As will be apparent from FIG. 3, point 38' is a point somewhat further than the golfer hits the ball. The golfer may recognize that he is incapable of hitting a shot the indicated distance and thus feel the game is unreal or alternatively, if the golfer feels he is hitting a good shot as represented by the indicated spot on the screen and then looks at a distance meter associated with the computer which shows that the ball did not travel anywhere near the distance indicated on the screen, the golfer may feel that the computer has cheated him. In any event, the golfer will be unhappy with the game.

FIGS. 2 and 3 also indicate that the change in terrain need not be great to cause great indicating errors. For example, in FIG. 2 the hill is only above the plane 34 a distance equal to about the golfer's height and indicated distance is about 0.57 of the actual distance as illustrated. Similarly in FIG. 3 the valley is below the plane 34' a distance equal to about the height of a golfer and the indicated distance is about 1.64 of the actual distance as illustrated.

The prior art, which heretofore has provided scenes by taking pictures from various points on actual golf courses, has completely failed to recognize the problem that exists in attempting to represent the point of termination of the shot on a projected scene that depicts a portion of a gold course having an uneven terrain. Applicant has determined however that the problem may be solved by providing a scene that depicts the terrain on a flat course. In such a case, the terrain line corresponding to the lines 36 and 36' would coincide with the line defining the plane 34 or 34' so that points 38 and 38' would always coincide with the points 32 and 32' and there would be no error in indication. In other words, the invention resides in a golf game wherein the scenes displayed to a golfer illustrate a flat playing surface.

In the exemplary embodiment of applicant's invention such scenes are obtained as follows. As seen in FIG. 4, a map of a hole on a golf course, generally designated 40 is drawn.

The map 40 is divided into a plurality of zones 42 representing various portions of the golf course and each zone is provided with a marker 44 in the form of a small circle near the center thereof. The map 40 may indicate sand traps, rough, fairway, green and fringe areas as indicated and a fuller description thereof may be obtained from the above-cited application of Russell et al.

For a typical golf game, the maps 40 may be provided in sets of eighteen and may represent differing courses. Of course, the same map 40 will not be used for more than one hole in each given eighteen hole round. However, for the sake of simplification, only one is shown herein, it being understood that it is within the skill of the art to devise many similar such maps. Turning now to FIGS. 5–7, the manner in which the scenes are obtained will be described. A relatively rigid member generally designated 50 is provided and includes a planar, horizontal upper surface 52. On the upper surface 52, by means of conventional modeling techniques, a model of the hole depicted on the map 40 is built on a reduced scale. The upper limit of the scale may be generally set by reference to space requirements while the lower limit is set by the modeler's ability to provide trees, shrubs, etc. on a reduced scale that will appear real in photographs to be subsequently taken of the model as will hereinafter be described. In practice, a model of a 500-yard hole will generally be represented in about 15 to 20 feet.

Model trees 54 of appropriate scale and other shrubbery not shown may be secured to the upper surface 52 at appropriate locations. Additionally, if trees 54 are indicated on the map 40, the location of the trees 54 on the upper surface should correspond to the indicated location on the map 40. As best seen in FIG. 6, a green area 56 is defined by a line 58 and includes a scale flag stick 60. Lines 62 may define traps if desired.

A pair of roughly parallel lines 64 may define a fairway 66 and the area 68 to either side thereof may be considered to be the rough. By means using paint of differing tints and/or artificial grass of differing colors, the interfaces between the green 56, the fairway 66 and the rough 68 as well as the traps 62 will be realistically demarcated.

If desired, a pair of roughly parallel lines 70 may be used to define a creek or the like.

Just behind the location of the green 56 on the upper surface 52 there may be located a generally vertical backdrop 72. Blue sky and cloudy areas generally designated 74, may be painted thereon as desired.

Just above the lower edge of the backdrop 72 there is painted an appropriate indication of the horizon which is illustrated in FIG. 6 as a line 76. To simplify the photographing procedure, it is generally desirable that the horizontal line 76 be located above the upper surface 52 a distance equal to the height of the optical axis of a camera used to photograph the scenes for reasons that will become apparent hereinafter.

A conventional camera 78 may be rested directly on the upper surface 52 or, if desired, slightly elevated therefrom by any suitable supporting means. However, as the "eye" of the camera is intended to "see" the golf hole in the same way that a golfer would see the same when standing on the playing surface of an identical full sized golf course, it is generally desirable that the optical axis 80 (FIG. 7) of the camera 78 be as close as possible to a plane just above the upper surface 52 and separated therefrom by a scale factor representing the height of a golfer's eyes which will be on the order of around five foot ten inches. Of course, the scale factor chosen for the building of the model will generally be a rather high ratio and in most instances, with standard cameras, it will be difficult to get the optical axis of the camera 78 close enough to the desired plane because of the physical size of the camera 78. It has been found that if the optical axis of the camera 78 is within approximately twenty scale feet from the upper surface 52, because of the perspective nature of the scenes being photographed, a golfer playing the game will not recognize that he will be seeing a scene that represents the view from a point twenty feet above the playing surface.

When the method of the instant invention is used to provide scenes for a golf game such as that described in the above-identified copending application of Russell et al., it is desirable that a projection 80 of the optical axis of the camera 78 pass through a vertical line coextensive with the flag stick 60 and a horizontal line with the horizon line 76. In order to accomplish the former, the camera 78 may be provided with a sighting apparatus (not shown) that may be aligned with the flag stick 60. The latter may be accomplished simply by supporting the camera on the upper surface 52 such that the optical axis 80 is horizontal and by arranging the backdrop 72 such that the horizon line 76 is in the same horizontal plane as the optical axis 80. In other words, the horizon line 76 is sufficiently high so that its optical position with respect to the vertical in relation to the camera does not change as the camera's location on the model is changed.

The necessity for the above-described relationship resides in the fact that the computing and display arrangement of the Russell et al golf game is such that for a shot hit an infinite distance, the computer circuitry and the ball spot projector are arranged to project the ball spot to the midpoint, with respect to the vertical, of the projected scene. For a standard camera, the vertical midpoint of the scene photographed by the camera would be defined by a horizontal plane encompassing the optical axis of the camera and as a result, the ball spot indication of a shot hit an infinite distance would be on the horizon line on the scene which is the correct result. By having the horizon line centered with respect to the vertical on the projected scene, the capability of the system to adequately indicate both rolling shots and the peaks of the trajectories of high shots is maximized.

Additionally, in the Russell et al. computing system, the Z coordinate will always be, by definition, along a line between the cup and the tee point. Thus, by horizontally centering the scene about such a line, the indicating capabilities of the system are maximized by providing the ability to indicate misdirected shots to both the right or the left to the same extent.

Of course, the foregoing relationships need not be adhered to if, for some reason, it is not desired to indicate a shot misdirected to either the left or the right or to show the ball at the peak of its trajectory in flight.

However, as will become apparent hereinafter, it is desirable to orient the camera such that the horizon line will be located at the same point with respect to the vertical for each differing scene.

The camera 78 is located at various points on the upper surface 52 of the model, each point corresponding to the center 44 of a corresponding one of the zones 42 on the map utilizing the above-stated relationships and the model photographed from each such location. The resulting photographs are then developed and assembled into a film strip for use with a film strip projector such as the above-identified Pratt et al. projector, or alternatively, arranged as individual slides if a slide projector is to be used.

The scenes are then placed in the projector for use with the golf game.

Figure 9:
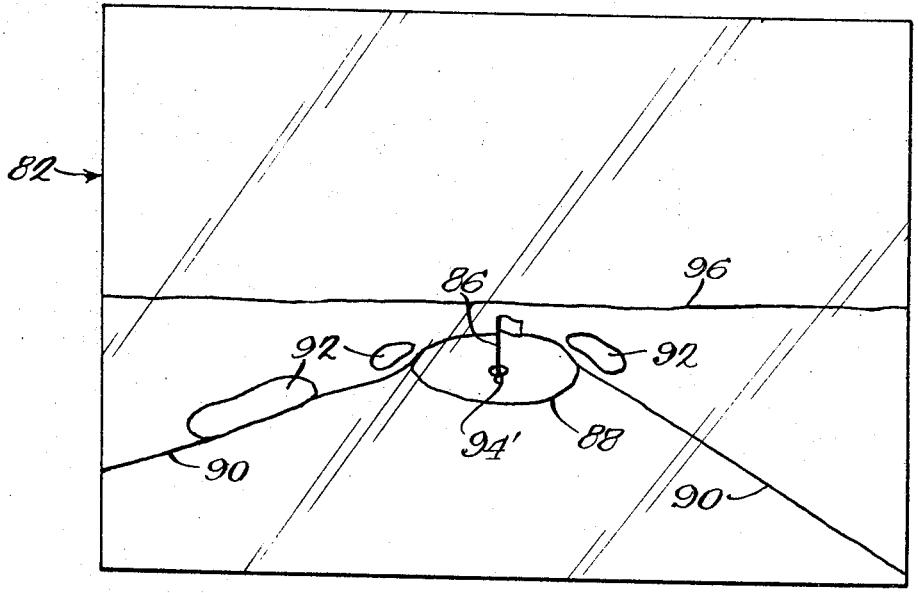
FIG. 9 is a schematic front view of another projected scene in accordance with the invention.

As a result of the foregoing, a golf game having an extreme degree of realism through accurate indication of a ball flight is provided. An example of a typical indication is illustrated in FIGS. 8 and 9. For purposes of illustration, it is considered that the projected ball spot is driven by the computing system described in the above-identified application of Russell et al. Referring specifically to FIG. 8, a scene representing the view from the tee on a 450-yard hole is shot projected on a screen 82. Trees, shrubbery, etc. have been omitted from the scene for the purpose of clarity.

The scene includes a horizon line 84 which is located at midpoint of the screen 82 with respect to the vertical and a flag stick 86 which is located at the midpoint of the screen 82 with respect to the horizontal. The flag stick 86 designates a cup on a green 88 which is located below the horizon line 84 and the boundaries of the fairway are designated by lines 90. Additionally, traps 92 are illustrated.

If it be assumed that a golfer drove the ball 225 yards, or about half the distance from the tee to the flag stick 86, the Russell et al. computing system would cause a ball spot 94 to indicate the point of termination of the shot as shown in FIG. 8. This, of course, assumes that the ball was hit straight toward the flag stick 86 with no side spin or at either to the right or the left of the flag stick 86 but with sufficient side spin to cause the ball to hook or slice and come to rest on a line extending between the tee and the flag stick 86.

As a result of information provided by the Russell et al computing system, a scene representing the view from the zone in which the ball came to rest could then be displayed to a golfer for his second shot. FIG. 9 illustrates such a scene. The scene illustrated in FIG. 9 includes a horizon line 96 which again is located at the midpoint of the screen 82 with respect to the vertical. The flag stick 86 is again displayed at the midpoint of the screen with respect to the horizontal but insofar as it is viewed from a closer point, its size is enlarged. More specifically, since the scene illustrated in FIG. 9 represents the view from a position half way between the cup of the hole and the point represented by the scene shown in FIG. 8, the flag stick 86 as illustrated in FIG. 9 will be twice the size of the flag stick illustrated in FIG. 8. Similarly, the dimensions of the green 88 and the traps 92 will be doubled. Also, portions of the lines 90 marking the fairway are illustrated as below a horizontal line passing through the ball spot 94 in FIG. 8 will not be illustrated. Finally, the distance between the hole on the green 88 and the horizon line 96 in FIG. 9 will be twice the distance between the hole on the green 88 and the horizon line 84 in FIG. 8.

It will re recalled that the Russell et al. computing system will project the ball spot to the same position on the screen with respect to the vertical for all shots having the same final Z coordinate. Thus, if the golfer, for his second shot were to hit a shot in all respects identical to the first shot mentioned above in conjunction with the description of FIG. 8, the ball spot, designated 94' in FIG. 9, would be illustrated at the base of the flag stick 86 as shown in FIG. 9. That is, two straight, 225-yard shots on a 450-yard hole played on a golf game made according to the invention and used scenes made according to the teachings set forth above, would result in the indication illustrated in FIG. 9. This of course is the correct and real result.

Such a result is achieved through the use of scenes depicting a flat course and the fact that the location of the horizon line in each different scene is maintained constant. In other words the horizon line serves as a reference point when the scenes are taken and for all scenes showing the hole it is vertically above and perspectively behind the hole. Of course, other reference points could be used providing they are above and perspectively behind the hole in the scene. The correct effect is attained because, as mentioned previously, the distance between the horizon line and the rear edge of the green in FIG. 9 is twice the distance between the rear edge of the green and the horizon line in FIG. 8. Since the horizon line is always located at the same point on the screen 82, the increase in distance between the horizon line and the rear edge of the green or, for that matter the base of the flag stick, in effect, "lowers" the target on the screen a distance inversely proportional to the ratio of the distance remaining to the hole to the total length of the hole.

It will be appreciated that as a result of this unique relationship, no special compensation means need be provided in the computing system to correlate the final position of the ball spot with the distance to be traversed to the cup which, of course, will change for each shot.

Furthermore, the benefits of depicting a flat course are clearly recognizable from an inspection of FIG. 9. For example, if the scene of FIG. 9 was taken on an actual course having an uneven terrain and the green 88 was elevated above the tee point, it will be apparent that the green would be indicated at a location above that illustrated in FIG. 9. As a result, even though the golfer would have perfectly negotiated the entire distance to the cup, the ball spot 94' would be below the base of the flag stick 86. Similarly, if the scene was taken on a course having an uneven terrain and the green was located in a valley, the same would be illustrated on the screen in a position below the green 88 as seen in FIG. 9. Again, even though the golfer has perfectly negotiated the distance to the cup, the ball spot 94' would not illustrate the same. Rather, the ball spot 94' would be illustrated as being above the base of the flag stick 86.

From the foregoing, it will be appreciated that a golf game and a method for providing the same according to the invention result in a structure that maximizes the realism and thus the commercial attractiveness of indoor golf games and accomplishes the same at a relatively low cost. Through use of the invention, inaccurate representations of the flight of the ball which may be irksome to a golfer playing the game are avoided and similarly, highly complex memory and computing systems that would provide the desired realism but would render the game commercially uneconomical are avoided.

Furthermore, the invention may be practiced simply and at a convenient location using known photographic and modeling techniques and without the need of transporting photographers and equipment to a remotely located golf course for the purpose of photographing scenes thereon. Finally, because each hole may be designed as desired, a great deal of flexibility is present in the makeup of the course to be played by the golfer on the indoor game. For example, using known golf architecture techniques, a course may be made as simple or as difficult as may be desirable. Additionally, through the invention, it is possible to provide golf holes duplicating identically, famous holes on various golf courses throughout the country with the exception that changes in terrain of the actual hole will be ironed out to provide a "flat" hole model as required for accurate representation of the ball flight to a golfer.

Having described a specific embodiment of my invention, I do not wish to be limited to the details set forth, but rather to have my invention construed as set forth in the following claims.

I claim:

1. A method of providing perspective scenes of portions of a hole on a golf course for use with golf games wherein a scene illustrating a portion of a golf hole is displayed to a golfer, the golfer hits a ball towards a scene, parameters relative to the trajectory of a ball so hit are measured, a computer computes the trajectory of the ball so hit on the basis of the parameters and the results of computation are displayed to the golfer by projecting a spot of light on the displayed scene by projecting means responsive to the computer, the method maximizing the accuracy of at least the display of the point of termination of the shot and including the steps of:
    a. building a model of a golf hole on a reduced scale having a flat playing surface, and
    b. photographing said playing surface from differing points on said model.

2. A method according to claim 1 wherein step (a) further comprises building the model of the golf hole on a member having an upper, planar surface and providing a generally vertical backdrop therefor, the backdrop including indicia depicting a horizon line; and step (b) further includes utilizing a camera to photograph the playing surface and orienting the camera so that the horizon line on the backdrop will be at the same position with respect to the vertical for each scene taken of the model.

3. A method according to claim 2 wherein said horizon line on said backdrop is spaced above the playing surface of the model a distance identical to the distance between said playing surface and a predetermined portion of the camera.

4. A method according to claim 1 wherein step (a) further includes providing an indication of a horizon line behind the golf hole and step (b) further includes utilizing a camera to photograph the playing surface and orienting the camera so that the horizon line will be at the same position with respect to the vertical on each scene taken from each of the differing points on the model.

5. A method of providing perspective scenes of portions of a hole on a golf course for use with golf games wherein various scenes illustrating portions of a golf hole are individually displayed to a golfer, the golfer hits a ball towards a scene, parameters relative to the trajectory of the ball are measured, a computer computes the trajectory of the ball on the basis of the parameters and the results or computation are displayed on the golfer by projecting a spot of light on the displayed scene by projecting means responsive to the computer, the method maximizing the accuracy of at least the display of the point of termination of the shot and including the steps of:
    a. making a map of an individual hole on a golf course;
    b. dividing the golf hole area depicted on the map into a plurality of differing zones;
    c. building a model of the golf hole illustrated on the map on a member having a planar surface so that the model golf hole will have a flat playing surface; and
    d. photographing the playing surface of the model golf hole from a plurality of differing points thereon, each point corresponding to a zone on the map.

* * * * *